(12) United States Patent
Ackerson, II

(10) Patent No.: US 11,939,207 B1
(45) Date of Patent: Mar. 26, 2024

(54) FUEL RECOVERY SYSTEM

(71) Applicant: Ronald Ackerson, II, Jacksonville, FL (US)

(72) Inventor: Ronald Ackerson, II, Jacksonville, FL (US)

(*) Notice: Subject to any disclaimer, the term of this patent is extended or adjusted under 35 U.S.C. 154(b) by 227 days.

(21) Appl. No.: 17/549,967

(22) Filed: Dec. 14, 2021

(51) Int. Cl.
*B67D 7/04* (2010.01)
*B60S 5/02* (2006.01)
*G06Q 20/20* (2012.01)
*B67D 7/00* (2010.01)

(52) U.S. Cl.
CPC .............. *B67D 7/04* (2013.01); *B60S 5/02* (2013.01); *G06Q 20/20* (2013.01); *B67D 7/007* (2013.01)

(58) Field of Classification Search
CPC .. B67D 7/00; B67D 7/007; B67D 7/04; B60S 5/00; B60S 5/02; G06Q 20/20
See application file for complete search history.

(56) References Cited

U.S. PATENT DOCUMENTS

| | | | | | |
|---|---|---|---|---|---|
| 3,783,888 | A | * | 1/1974 | Johnson | F04F 10/02 285/242 |
| 5,092,294 | A | * | 3/1992 | Jackson | F02M 69/465 123/198 C |
| 5,257,651 | A | * | 11/1993 | Thompson | B60S 5/02 141/392 |
| 5,332,010 | A | * | 7/1994 | Thompson | B67D 7/04 141/7 |
| 6,145,622 | A | * | 11/2000 | Clark | F01M 11/045 137/205 |
| 7,171,995 | B2 | * | 2/2007 | Eshenour | B67D 7/04 141/230 |
| 9,139,082 | B2 | * | 9/2015 | Paolucci | B60K 15/00 |
| 9,878,897 | B2 | * | 1/2018 | Rogers | B67D 7/04 |
| 10,400,957 | B2 | * | 9/2019 | Kennedy | F17C 9/00 |
| 11,209,126 | B2 | * | 12/2021 | Kennedy | F17C 13/04 |
| 2011/0036428 | A1 | * | 2/2011 | Lynn | B67D 7/60 137/565.17 |
| 2011/0197855 | A1 | * | 8/2011 | Johnson | F02M 37/00 123/445 |
| 2012/0022768 | A1 | * | 1/2012 | Johnson | F02M 37/00 701/103 |
| 2014/0156455 | A1 | * | 6/2014 | Atwood | G06Q 10/30 705/26.25 |
| 2015/0254613 | A1 | * | 9/2015 | Madden | G06Q 10/30 705/14.38 |
| 2017/0246977 | A1 | * | 8/2017 | McGuffin | F02D 41/266 |

* cited by examiner

*Primary Examiner* — Nicolas A Arnett
(74) *Attorney, Agent, or Firm* — Kyle A. Fletcher, Esq.

(57) ABSTRACT

The fuel recovery system is a mechanical structure. The fuel recovery system comprises a station structure, a control circuit, a pump, and a vehicle. The control circuit and the pump mount in the station structure. The vehicle further comprises a fuel reservoir. The fuel reservoir contains the fuel used to power the vehicle. The fuel recovery system pumps fuel out of the fuel reservoir for storage. The fuel recovery system compensates the vehicle owner for the removed fuel through a transaction.

13 Claims, 4 Drawing Sheets

US 11,939,207 B1

FUEL RECOVERY SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of devices for transferring liquids between vehicles or containers. (B67D7/04)

SUMMARY OF INVENTION

The fuel recovery system is a mechanical structure. The fuel recovery system comprises a station structure, a control circuit, a pump, and a vehicle. The control circuit and the pump mount in the station structure. The vehicle further comprises a fuel reservoir. The fuel reservoir contains the fuel used to power the vehicle. The fuel recovery system pumps fuel out of the fuel reservoir for storage. The fuel recovery system compensates the vehicle owner for the removed fuel through a transaction.

These together with additional objects, features and advantages of the fuel recovery system will be readily apparent to those of ordinary skill in the art upon reading the following detailed description of the presently preferred, but nonetheless illustrative, embodiments when taken in conjunction with the accompanying drawings.

In this respect, before explaining the current embodiments of the fuel recovery system in detail, it is to be understood that the fuel recovery system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the fuel recovery system.

It is therefore important that the claims be regarded as including such equivalent construction insofar as they do not depart from the spirit and scope of the fuel recovery system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
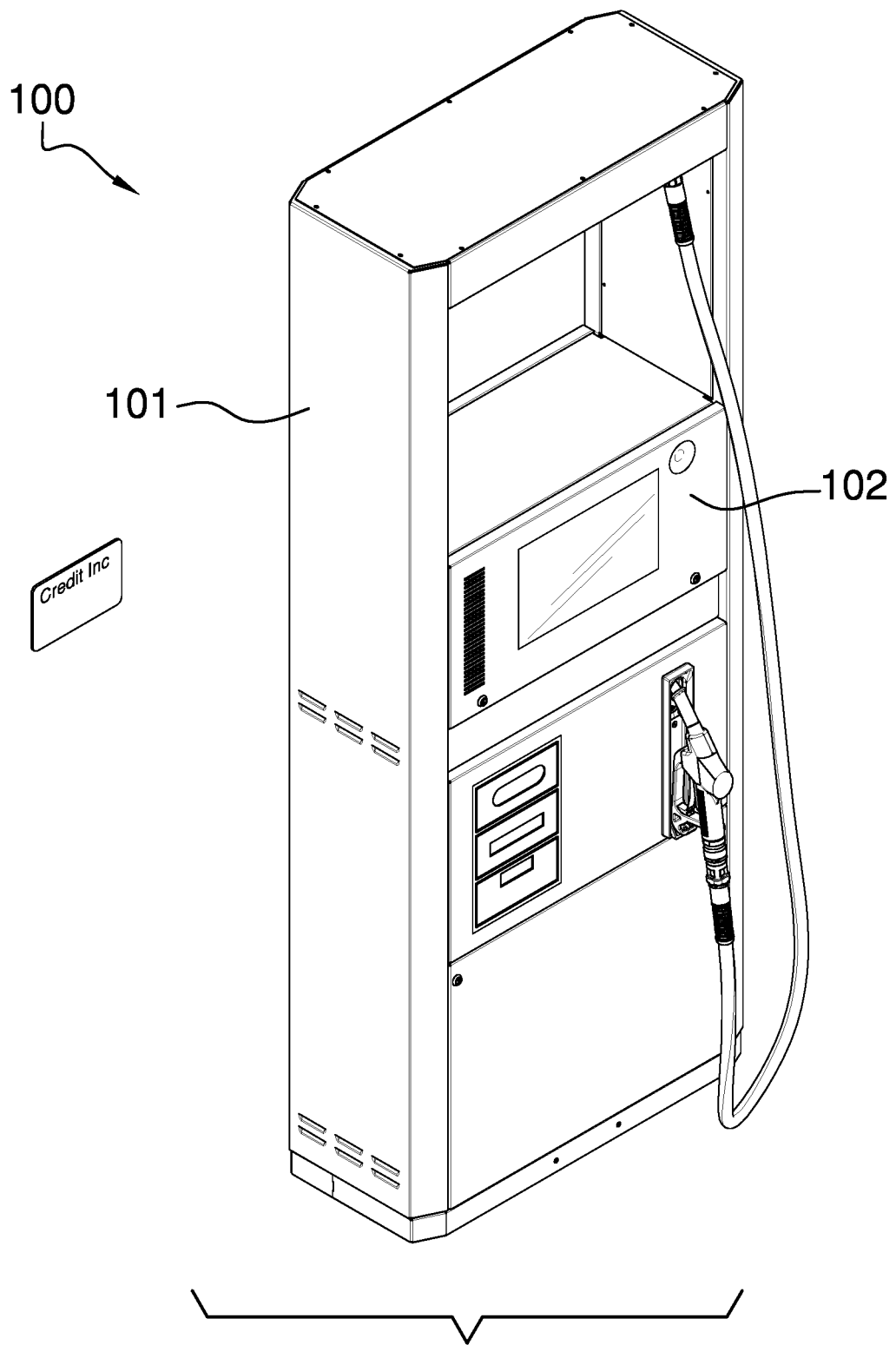
FIG. 1 is a perspective view of an embodiment of the disclosure.
Figure 2:
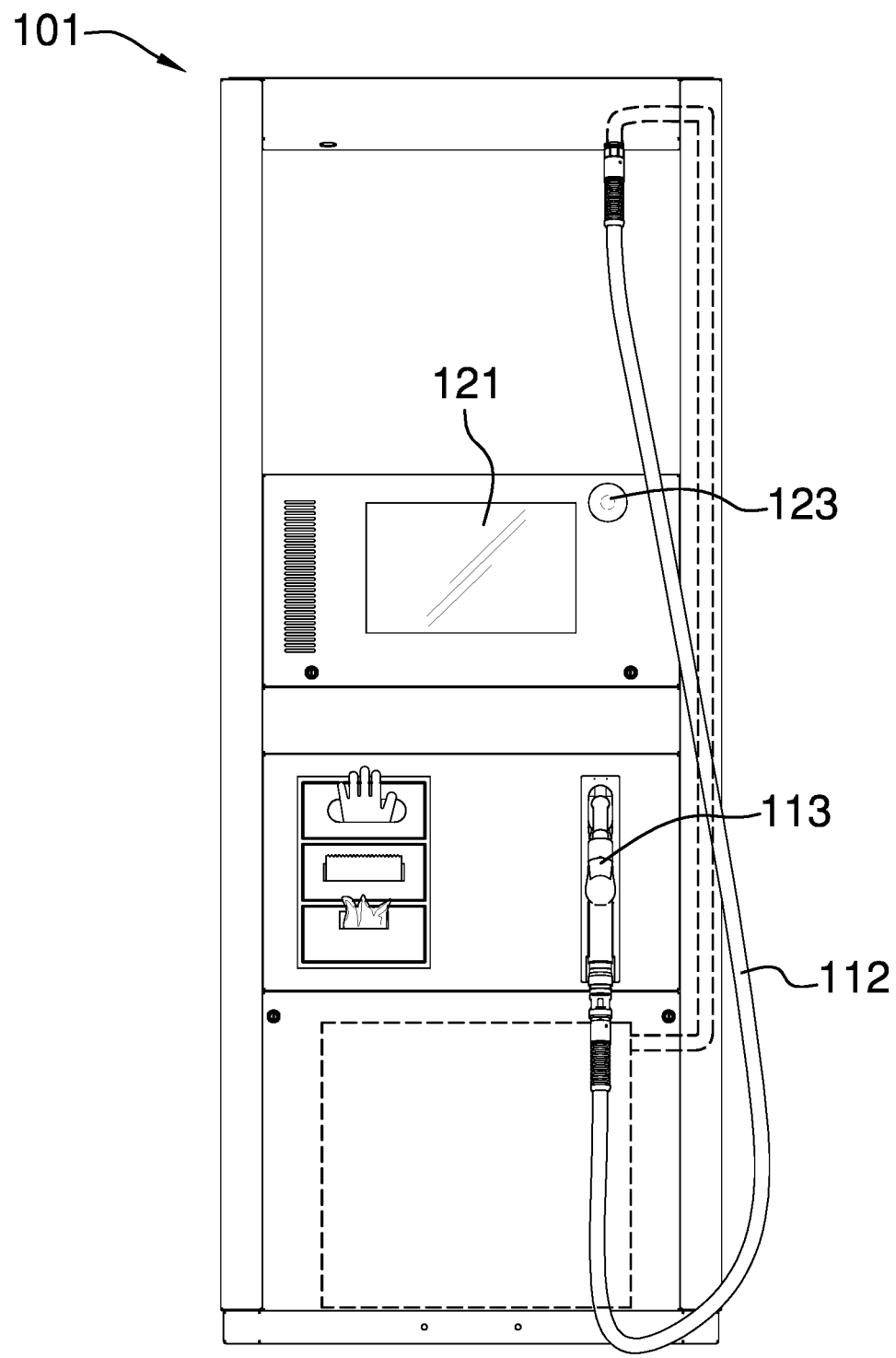
FIG. 2 is a front view of an embodiment of the disclosure.
Figure 3:
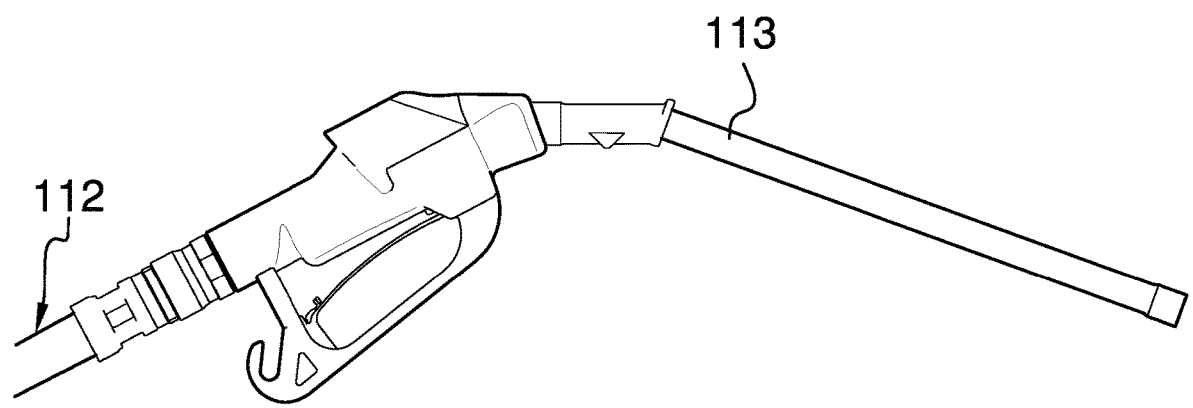
FIG. 3 is a detail view of an embodiment of the disclosure.
Figure 4:
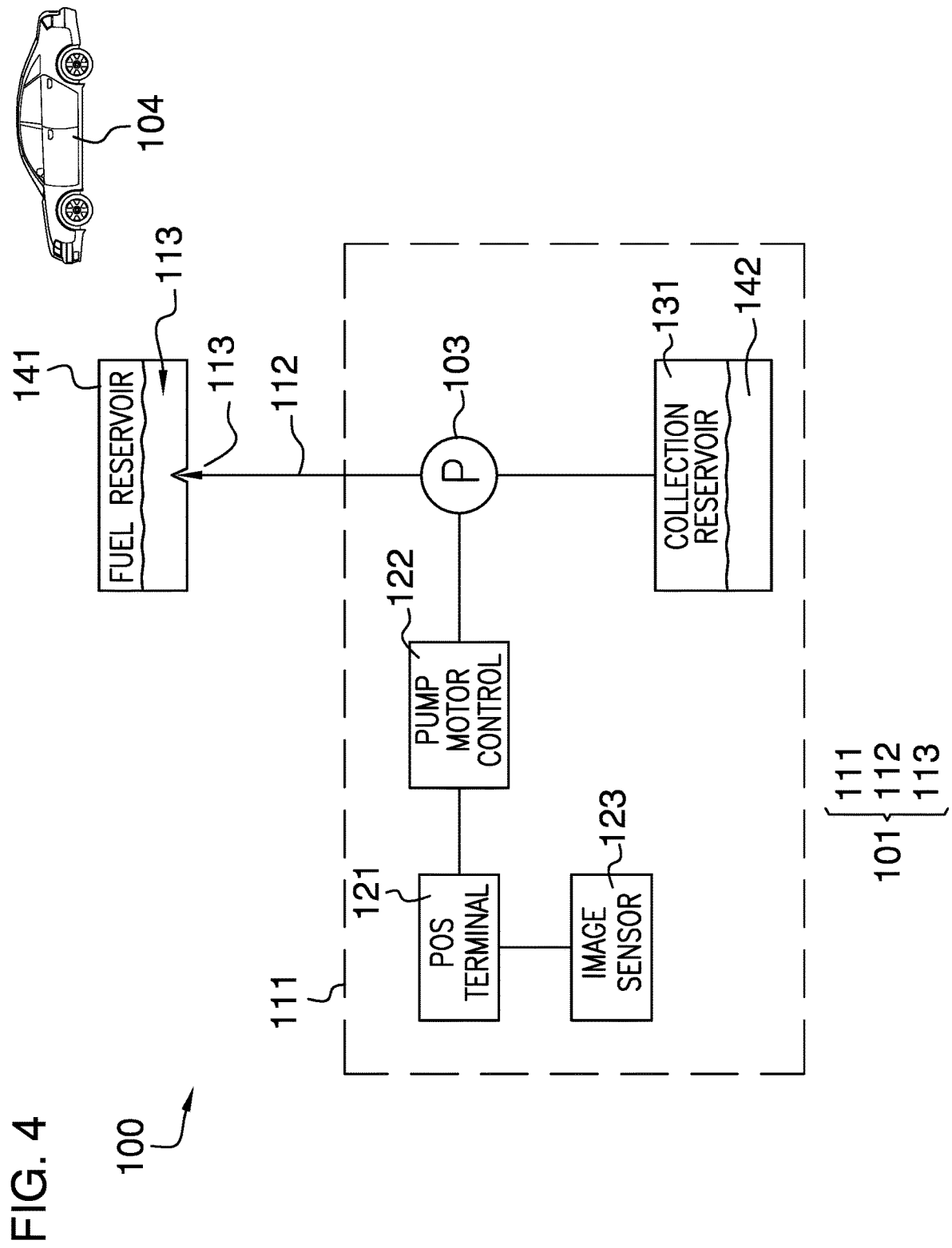
FIG. 4 is a schematic view of an embodiment of the disclosure.

Detailed reference will now be made to one or more potential embodiments of the disclosure, which are illustrated in FIGS. 1 through 4.

The fuel recovery system 100 (hereinafter invention) is a mechanical structure. The invention 100 comprises a station structure 101, a control circuit 102, a pump 103, and a vehicle. The control circuit 102 and the pump 103 mount in the station structure 101. The vehicle further comprises a fuel 142 reservoir 141. The fuel 142 reservoir 141 contains the fuel 142 used to power the vehicle. The invention 100 pumps fuel 142 out of the fuel 142 reservoir 141 for storage. The invention 100 compensates the vehicle 104 owner for the removed fuel 142 through a transaction.

The fuel 142 is a liquid phase hydrocarbon based chemical. The fuel 142 is a source of chemical potential energy. The vehicle 104 converts the chemical potential energy contained in the fuel 142 into motive forces used to propel the vehicle 104. The fuel 142 reservoir 141 is a fluid containment structure. The fuel 142 reservoir 141 mounts in the vehicle 104. The fuel 142 reservoir 141 forms the structure that stores the fuel 142 used by the vehicle 104.

The pump 103 is a mechanical structure. The pump 103 electrically connects with the control circuit 102. The control circuit 102 controls the operation of the pump 103. The pump 103 forms a fluidic connection with the fuel 142 reservoir 141 of the vehicle 104. The pump 103 forms a fluidic connection with a fuel 142 collection reservoir 131. The pump 103 generates a pressure differential between the fuel 142 reservoir 141 and the fuel 142 collection reservoir 131 that physically transports the fuel 142 out of the fuel 142 reservoir 141 into the fuel 142 collection reservoir 131. The pump 103 is a metered pump 103. The metered pump 103 is defined elsewhere in this disclosure.

The fuel 142 collection reservoir 131 is a fluid containment structure. The fuel 142 collection reservoir 131 forms a fluidic connection with the pump 103. The fuel 142 collection reservoir 131 receives and stores the fuel 142 that is pumped out of the fuel 142 reservoir 141 by the pump 103.

The station structure 101 forms a fluidic connection between the fuel 142 reservoir 141 of the vehicle 104 and the pump 103. The station structure 101 is a rigid structure. The station structure 101 contains the pump 103 and the control circuit 102. The station structure 101 is formed with all apertures and form factors necessary to allow the station structure 101 to accommodate the use and operation of the pump 103 and the control circuit 102. Methods to form a station structure 101 suitable for the purposes described in this disclosure are well-known and documented in the mechanical arts. The station structure 101 comprises a housing structure 111, a hose structure 112, and an intake nozzle 113.

The housing structure 111 is a rigid structure. The housing structure 111 is a fluid impermeable structure. The housing structure 111 forms the exterior surfaces of a protected space that contains the pump 103 and the control circuit 102. The housing structure 111 is formed with all apertures and form factors necessary to allow the housing structure 111 to accommodate the use and operation of the invention 100. Methods to form a housing structure 111 suitable for the purposes described in this disclosure are well-known and documented in the mechanical arts.

The hose structure 112 is a hose. The hose is defined elsewhere in this disclosure. The hose structure 112 forms a fluidic connection between the fuel 142 reservoir 141 of the vehicle 104 and the pump 103. The hose structure 112 physically transports the fuel 142 drawn out of the fuel 142 reservoir 141 to the pump 103.

The intake nozzle 113 is a nozzle. The intake nozzle 113 forms a fluidic connection between the hose structure 112 and the fuel 142 reservoir 141. The intake nozzle 113 inserts into the fuel 142 reservoir 141. The pump 103 generates a pressure differential that draws the fuel 142 out of the fuel 142 reservoir 141 into the intake nozzle 113. The intake nozzle 113 physically transports the fuel 142 from the fuel 142 reservoir 141 to the hose structure 112.

The control circuit 102 is an electric circuit. The control circuit 102 controls the operation of the invention 100. The control circuit 102 electrically connects to the pump 103. The control circuit 102 pumps the fuel 142 out of the vehicle 104. The control circuit 102 measures the amount of fuel 142 pumped out of the vehicle 104 for storage. The control circuit 102 completes a financial transaction that compensates the vehicle 104 owner for the value of the fuel 142 removed from the vehicle 104. The control circuit 102 comprises a point of sale terminal 121, a pump 103 motor control circuit 122, and an image sensor 123.

The point of sale terminal 121 is a programmable electric circuit. The point of sale terminal 121 controls the operation of the invention 100. The point of sale terminal 121 electrically connects to the pump 103. The point of sale terminal 121 pumps the fuel 142 out of the vehicle 104 and into the fuel 142 collection reservoir 131. The point of sale terminal 121 controls the operation of the pump 103. The point of sale terminal 121 initiates the operation of the pump 103 to pump the fuel 142 into the fuel 142 collection reservoir 131. The point of sale terminal 121 measures the amount of fuel 142 pumped out of the vehicle 104 for storage. The point of sale terminal 121 discontinues the operation of the pump 103 once the desired amount of fuel 142 has been removed from the fuel 142 reservoir 141. The point of sale terminal 121 completes a financial transaction that compensates the vehicle 104 owner for the value of the fuel 142 removed from the vehicle 104. The point of sale terminal 121 is defined elsewhere in this disclosure.

The pump 103 motor control circuit 122 is an electric circuit. The pump 103 motor control circuit 122 electrically connects to the point of sale terminal 121. The point of sale terminal 121 controls the operation of the pump 103 motor control circuit 122. The pump 103 motor control circuit 122 initiates the operation of the pump 103. The pump 103 motor control circuit 122 measures the amount of fuel 142 pumped out of the fuel 142 collection reservoir 131. The pump 103 motor control circuit 122 communicates the measured amount of fuel 142 that is pumped out of the fuel 142 collection reservoir 131 to the point of sale terminal 121. The pump 103 motor control circuit 122 discontinues the operation of the pump 103 at the end of the transfer process.

The image sensor 123 is a sensor. The image sensor 123 electrically connects to the point of sale terminal 121. The point of sale terminal 121 controls the operation of the image sensor 123. The image sensor 123 captures images of the transaction being processed by the point of sale terminal 121. The image sensor 123 converts the captured images into electrical signals that are transmitted to the point of sale terminal 121. The image sensor 123 is defined elsewhere in this disclosure.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Barrier: As used in this disclosure, a barrier is a physical obstacle that forms a boundary between a first space and a second space. The barrier prevents the passage of an object between the first space and the second space.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Control Circuit: As used in this disclosure, a control circuit is an electrical circuit that manages and regulates the behavior or operation of a device.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Exterior: As used in this disclosure, the exterior is used as a relational term that implies that an object is not contained within the boundary of a structure or a space.

Flow: As used in this disclosure, a flow refers to the passage of a fluid past a fixed point. This definition considers bulk solid materials as capable of flow.

Fluid: As used in this disclosure, a fluid refers to a state of matter wherein the matter is capable of flow and takes the shape of a container it is placed within. The term fluid commonly refers to a liquid or a gas.

Fluidic Connection: As used in this disclosure, a fluidic connection refers to a tubular structure that transports a fluid from a first object to a second object. Methods to design and use a fluidic connections are well-known and documented in the mechanical, chemical, and plumbing arts.

Fluid Network: As used in this disclosure, a fluid network refers to a transport structure that: a) receives a fluid into the fluid network; b) transports the fluid through a series of pipes, valves, and manifolds; and, c) discharges the fluid from the fluid network.

Force: As used in this disclosure, a force refers to a net (or unopposed) measurable interaction that changes the direction of motion of an object, the velocity of motion of an object, the momentum of an object, or the stress within an object. The term work refers to a measure of the amount of energy that is transferred through the application of a force over a distance. The term power refers to a measure of the amount of energy that is transferred over a period of time.

Form Factor: As used in this disclosure, the term form factor refers to the size and shape of an object.

Fuel: As used in this disclosure, fuel refers to a substance that undergoes a chemical combustion reaction to release chemical potential energy.

Gas: As used in this disclosure, a gas refers to a state (phase) of matter that is fluid and that fills the volume of the structure that contains it. Stated differently, the volume of a gas always equals the volume of its container.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Grip: As used in this disclosure, a grip is an accommodation formed on or within an object that allows the object to be grasped or manipulated by a hand.

Handle: As used in this disclosure, a handle is an object by which a tool, object, or door is held or manipulated with the hand.

Hose: As used in this disclosure, a hose is a flexible hollow prism-shaped device that is used for transporting liquids and gases. When referring to a hose in this disclosure, the terms inner dimension and outer dimension are used as they would be used by those skilled in the plumbing arts.

Housing: As used in this disclosure, a housing is a rigid structure that encloses and protects one or more devices.

Image Sensor: As used in this disclosure, an image sensor detects electromagnetic light from the exterior of the image sensor and converts the detected electromagnetic radiation into a digital representation of sufficient detail to allow a logic module to create and display a visual reproduction of the source of the captured electromagnetic radiation.

Interface: As used in this disclosure, an interface is a physical or virtual boundary that separates two different systems and across which information is exchanged.

Liquid: As used in this disclosure, a liquid refers to a state (phase) of matter that is fluid and that maintains, for a given pressure, a fixed volume that is independent of the volume of the container.

Interior: As used in this disclosure, the interior is used as a relational term that implies that an object is contained within the boundary of a structure or a space.

Metered Pump: As used in this disclosure, a metered pump is a pump that pumps a fluid at a specified volumetric flow rate that is independent of the pressure of the fluid entering the pump. The accuracy of a metered pump is assumed to be less than 3% of the specified volumetric flow rate over the specified operating range of the fluid pressure entering the pump. Commercially available metered pumps exist that are significantly more accurate than 3%.

Negative Space: As used in this disclosure, negative space is a method of defining an object through the use of open or empty space as the definition of the object itself, or, through the use of open or empty space to describe the boundaries of an object.

Nozzle: As used in this disclosure, a nozzle is a device that receives fluid under pressure and releases the fluid in a controlled manner into an environment. An intake nozzle refers to a device that generates a negative pressure within the nozzle structure such that the intake nozzle draws a fluid into the intake nozzle from a reservoir.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Perimeter: As used in this disclosure, a perimeter is one or more curved or straight lines that bounds an enclosed area on a plane or surface. The perimeter of a circle is commonly referred to as a circumference.

Phase: As used in this disclosure, phase refers to the state of the form of matter. The common states of matter are solid, liquid, gas, and plasma.

Plasma: As used in this disclosure, plasma refers to a state (phase) of matter wherein the outer valence electrons of an atom (or molecule) have been separated from their nucleus but remain with the matter. A plasma is an electrically neutral state of matter that is formed from the ions of the separated atoms. Plasmas generally, but not necessarily behaves like a gas in that a plasma fills the volume of the structure that contains it. The flow of a plasma through the atmosphere is called an arc. An arc is generally created when the atmosphere is subjected to an electric field that ionizes the molecules forming the atmosphere.

Point of Sale Terminal: As used in this disclosure, a point of sale terminal is an electrically operated device that is maintained by a retail sales establishment. The point of sale terminal calculates the financial obligations incurred within a sales transaction. When the point of sale terminal is used as a node on a network, the point of sale terminal can be further used to process the financial transaction through a banking network. A point of sale terminal is often abbreviated as a POS or POP (point of purchase) device.

Pressure: As used in this disclosure, pressure refers to a measure of force per unit area.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Protected Space: As used in this disclosure, a protected space is a negative space within which an object is stored. The protected space is enclosed by a barrier structure that: a) prevents damage to the object contained within the protected space; b) maintains an environment suitable within the protected space that is appropriate for the object; or, c) protects the object within the protected space from potential dangers that are outside of the protected space.

Pump: As used in this disclosure, a pump is a mechanical device that uses suction or pressure to raise or move fluids, compress fluids, or force a fluid into an inflatable object. Within this disclosure, a compressor refers to a pump that is dedicated to compressing a fluid or placing a fluid under pressure.

Reservoir: As used in this disclosure, a reservoir refers to a container or containment system that is configured to store a liquid.

Solid: As used in this disclosure, a solid refers to a state (phase) of matter that: 1) has a fixed volume; and, 2) does not flow.

Transaction: As used in this disclosure, a transaction refers to an exchange between two entities. The exchange refers to a transfer selected from the group consisting of physical objects, data, information, and knowledge. In a legal environment, at transaction refers to exchanges between legally recognized entities such as individuals and incorporated organizations of individuals.

Tube: As used in this disclosure, a tube is a hollow prism-shaped device formed with two open congruent ends. The tube is used for transporting liquids (including bulk solids) and gases. The line that connects the center of the first congruent face of the prism to the center of the second congruent face of the prism is referred to as the center axis of the tube or the centerline of the tube. When two tubes share the same centerline they are said to be aligned. When the centerlines of two tubes are perpendicular to each other, the tubes are said to be perpendicular to each other. In this disclosure, the terms inner dimensions of a tube and outer dimensions of a tube are used as they would be used by those skilled in the plumbing arts.

Vehicle: As used in this disclosure, a vehicle is a device that is used for transporting passengers, goods, or equipment. The term motorized vehicle specifically refers to a vehicle can move under power provided by an electric motor or an internal combustion engine. The term vehicle generically applies to motorized vehicles and vehicles without a motor. A motorized vehicle further comprises an electrical system that can be used as a source of electric energy. The enclosed passenger space of a vehicle is known as a cab.

With respect to the above description, it is to be realized that the optimum dimensional relationship for the various components of the invention described above and in FIGS. 1 through 4 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A fuel recovery system comprising
a station structure, a control circuit, a pump, and a vehicle;
wherein the control circuit and the pump mount in the station structure;
wherein the station structure forms a fluidic connection with the vehicle;
wherein the vehicle further comprises a fuel reservoir;
wherein the fuel reservoir contains the fuel used to power the vehicle;
wherein the fuel recovery system pumps fuel out of the fuel reservoir for storage;
wherein the fuel recovery system compensates the vehicle owner for the removed fuel through a transaction.

2. The fuel recovery system according to claim 1
wherein the pump is a mechanical structure;
wherein the pump electrically connects with the control circuit;
wherein the control circuit controls the operation of the pump;
wherein the pump forms a fluidic connection with the fuel reservoir of the vehicle;
wherein the pump forms a fluidic connection with a fuel collection reservoir;
wherein the pump generates a pressure differential between the fuel reservoir and the fuel collection reservoir that physically transports the fuel out of the fuel reservoir into the fuel collection reservoir.

3. The fuel recovery system according to claim 2 wherein the pump is a metered pump.

4. The fuel recovery system according to claim 3
wherein the fuel collection reservoir is a fluid containment structure;
wherein the fuel collection reservoir receives and stores the fuel that is pumped out of the fuel reservoir by the pump.

5. The fuel recovery system according to claim 4 wherein the station structure forms a fluidic connection between the fuel reservoir of the vehicle and the pump.

6. The fuel recovery system according to claim 5
wherein the control circuit is an electric circuit;
wherein the control circuit controls the operation of the fuel recovery system;
wherein the control circuit electrically connects to the pump;
wherein the control circuit pumps the fuel out of the vehicle;
wherein the control circuit measures the amount of fuel pumped out of the vehicle for storage;
wherein the control circuit completes a financial transaction that compensates the vehicle owner for the value of the fuel removed from the vehicle.

7. The fuel recovery system according to claim 6
wherein the station structure comprises a housing structure, a hose structure, and an intake nozzle;
wherein the housing structure is a rigid structure;
wherein the housing structure is a fluid impermeable structure;
wherein the housing structure forms the exterior surfaces of a protected space that contains the pump and the control circuit;
wherein the hose structure forms a fluidic connection between the fuel reservoir of the vehicle and the pump.

8. The fuel recovery system according to claim 7
wherein the control circuit comprises a point of sale terminal, a pump motor control circuit, and an image sensor;
wherein the point of sale terminal controls the operation of the fuel recovery system;
wherein the pump motor control circuit electrically connects to the point of sale terminal;
wherein the image sensor electrically connects to the point of sale terminal.

9. The fuel recovery system according to claim 8
wherein the hose structure is a hose;
wherein the hose structure physically transports the fuel drawn out of the fuel reservoir to the pump.

10. The fuel recovery system according to claim 9
wherein the intake nozzle is a nozzle;
wherein the intake nozzle forms a fluidic connection between the hose structure and the fuel reservoir;
wherein the intake nozzle inserts into the fuel reservoir;
wherein the pump generates a pressure differential that draws the fuel out of the fuel reservoir into the intake nozzle;
wherein the intake nozzle physically transports the fuel from the fuel reservoir to the hose structure.

11. The fuel recovery system according to claim 10
wherein the point of sale terminal is a programmable electric circuit;
wherein the point of sale terminal controls the operation of the fuel recovery system;
wherein the point of sale terminal electrically connects to the pump;
wherein the point of sale terminal controls the operation of the pump;
wherein the point of sale terminal initiates the operation of the pump to pump the fuel into the fuel collection reservoir;
wherein the point of sale terminal measures the amount of fuel pumped out of the vehicle for storage;
wherein the point of sale terminal discontinues the operation of the pump once the desired amount of fuel has been removed from the fuel reservoir;
wherein the point of sale terminal completes a financial transaction that compensates the vehicle owner for the value of the fuel removed from the vehicle.

12. The fuel recovery system according to claim 11
wherein the pump motor control circuit is an electric circuit;
wherein the point of sale terminal controls the operation of the pump motor control circuit;
wherein the pump motor control circuit initiates the operation of the pump;
wherein the pump motor control circuit measures the amount of fuel pumped out of the fuel collection reservoir;
wherein the pump motor control circuit communicates the measured amount of fuel that is pumped out of the fuel collection reservoir to the point of sale terminal;
wherein the pump motor control circuit discontinues the operation of the pump at the end of the transfer process.

13. The fuel recovery system according to claim 12
wherein the image sensor is a sensor;
wherein the point of sale terminal controls the operation of the image sensor;
wherein the image sensor captures images of the transaction being processed by the point of sale terminal;
wherein the image sensor converts the captured images into electrical signals that are transmitted to the point of sale terminal.

* * * * *